UNITED STATES PATENT OFFICE.

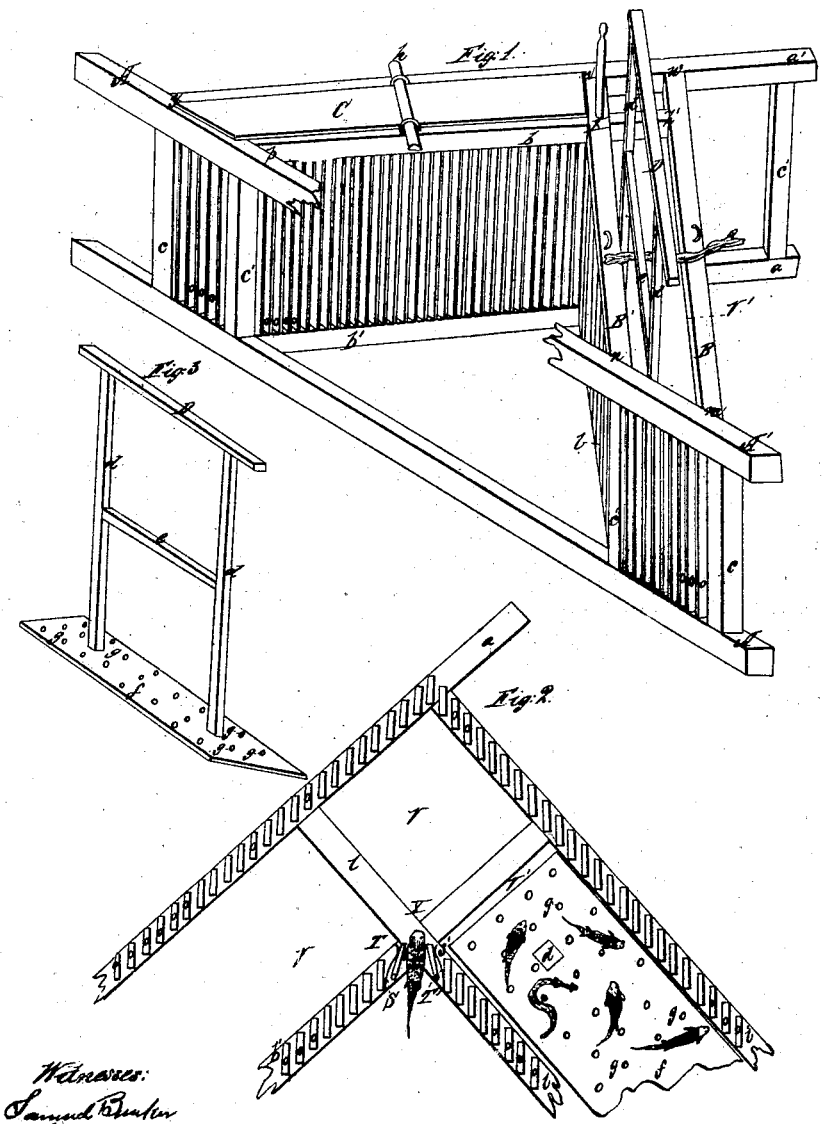

ROBERT GRAY, OF ANSON, MAINE.

FISH-TRAP.

Specification forming part of Letters Patent No. 22,644, dated January 18, 1859.

*To all whom it may concern:*

Be it known that I, ROBERT GRAY, of Anson, in the county of Somerset and State of Maine, have invented a new and useful Trap for Catching Fish in Streams; and I do hereby declare that the following is a full, clear, and exact description of the construction and operation of the same, reference being had to the accompanying drawings, making a part of this specification, in which—

Figure 1 is a perspective view of the trap; Fig. 2, a horizontal section of the throat and adjacent parts, and Fig. 3 a perspective view of the strainer.

In Figs. 1 and 2, $a\, b'\, l\, l'$ are the ground-sills; $A'\, B\, B'\, b\, a'$, the top beams, and $c\, c\, c'\, c'\, c'$ are the posts of the frame. In Fig. 1, $o\, o\, o$ are fixed slats, and $T\, T'$ the vibrating slats. $S\, S'$ are springs. $C$ is the cover to the chamber, which is retained in its position by the bar, and $i$ is the stop-rod. In Fig. 3, D is the top piece of the strainer; $e$, the cross-bar; $d\, d$, the uprights; and $f$, pierced with holes $g\, g\, g$, is the bottom of the strainer. $V\, V\, V'$ is the chamber. $m\, n\, p\, y\, w\, X\, z\, z'$ are the points where the top beams are framed to each other.

In constructing my trap I frame one end of B into A′, as at $m$, one end of $a'$ into A′, as at $y$. The free end of B is then framed into $a'$, as at $w$, $a'$ projecting a little beyond, as in Fig. 1. Between A′ and $a'$, and at a distance of about one foot from the bar B, I place B′, one end of which frames into A′, as at $n$, so that B′ may be parallel to B, with $b$ parallel to $a'$. I frame one of the ends of $b$ into A′, as at $p$. Then, after crossing B′, as at X, their free ends are framed into $a'$ and B, respectively, as at $z'$ and $z$. Through B′ and $b$, at X, (their crossing,) I bore a hole for the insertion of the rod $i$.

In a manner precisely similar to that in which I frame together A′, $a'$, B, B′, and $b$, I also frame together A, $l$, $l'$, $a$, and $b'$. I then take a piece of timber of length sufficient to reach from the bottom of the stream to its surface, frame it in between $a$ and $a'$, where they project beyond $l'$ and B, as post $c'$ between $a$ and $a'$, Fig. 1. In like manner I frame in four other posts, $c\, c$ at $m\, y$, and $c'$ and $c'$ at $n$ and $p$. I next make slats or rods $o\, o\, o\, o\, o\, o\, o\, o$, strong enough to withstand the current of the stream and long enough to reach from A to A′, (or the length of the posts between shoulders,) and fix them vertically and at such distance apart as to allow the water, and not the fish, to pass between them, in the following spaces, viz: between B and $l'$ through their entire length, between $a$ and $a'$ from $w$ to $y$, between B′ and $l$ from $n$, Fig. 1, to slat T′, Fig. 2, between $b$ and $b'$ from ground-sill A or $p$, Fig. 1, to slat T, Fig. 2, and between A and A′ the two spaces between $c$ and $c'$ and $c'$ and $c$. Thus I surround the chamber V V V′ with slat-work, the slats being all firmly fixed, excepting at the throat of the trap, where I place two slats, T T′, which vibrate upon pivots at their edges which look toward the mouth of the trap, and by which pivots they are attached to the sills $l$ and $b'$ below and the beams B′ and $b$ above. The edges of these slats nearest the letter X form the throat of the trap, and are allowed to come so near together as not to allow the fish to pass between them without pressing them apart, and they are retained in this position by springs S and S′, or other contrivance of sufficient force to return them to their places when pressed asunder, and not to prevent the fish from forcing its way between them in entering the trap.

To construct the strainer, Fig. 3, I use a piece of board or other substance, $f$, of sufficient area to nearly cover the bottom of that portion of the chamber marked V′, Fig. 1, and pierced with holes $g\, g\, g\, g$, so as to let water through, but not the fish. I attach to this two uprights, $d\, d$, of about the length of slats $o\, o\, o$. To the tops of these uprights I secure the top piece D, and at about midway between D and $f$ I insert the cross-bar $e$ between the uprights $d$ and $d$.

To use this trap, place it in the stream with its mouth facing the direction whence the fish are expected to come. Sink it to the bottom and confine it there by any convenient means. Level the bed of the stream up to the bottom of the trap by filling in stones or by driving piles or otherwise to prevent the fish from passing under the trap. Run a fence, wall, or dam from the posts $c$ and $c$ to each shore, so as to prevent the fish from passing between the trap and shore. Sink the strainer-base $f$ to the bottom of chamber V′, withdraw the rod $i$, and the trap is set.

In trying to pass along the stream the fish will enter the mouth of the trap, go along to the throat, press through between the vibrating slats T T' and enter the chamber V V V'. Not being able to proceed farther, and attempting to return, they fall back into those parts of the chamber near $m\,n$ or $p\,y$, and thus fail to detect the throat by which they entered the chamber. Now insert the rod $i$ into its place at X to prevent the possibility of the fishes' escape, drive them from V V into V', raise the strainer, as shown in Fig. 1, and take out the fish.

What I claim as my invention, and desire to secure by Letters Patent, is—

The strainer, Fig. 3, the vibrating slats T T', and the V-shaped chambers V V', all in the manner and for the purposes substantially as set forth in the above specification.

ROBERT GRAY.

Witnesses:
SAMUEL BUNKER,
M. S. AYER.